(12) United States Patent  
Lohmann

(10) Patent No.: US 8,437,889 B2  
(45) Date of Patent: May 7, 2013

(54) TEST EQUIPMENT FOR TESTING AN ADDITIONAL CENTER TANK (ACT) SYSTEM OF AN AIRCRAFT

(75) Inventor: Jürgen Lohmann, Hamburg (DE)

(73) Assignee: Airbus Operations GmbH (DE)

( * ) Notice: Subject to any disclaimer, the term of this patent is extended or adjusted under 35 U.S.C. 154(b) by 367 days.

(21) Appl. No.: 12/745,117

(22) PCT Filed: Nov. 29, 2007

(86) PCT No.: PCT/EP2007/010384  
§ 371 (c)(1),  
(2), (4) Date: Nov. 10, 2010

(87) PCT Pub. No.: WO2009/068070  
PCT Pub. Date: Jun. 4, 2009

(65) Prior Publication Data  
US 2011/0046820 A1   Feb. 24, 2011

(51) Int. Cl.  
*B64F 5/00* (2006.01)

(52) U.S. Cl.  
USPC .......................................... 701/3; 701/29.8

(58) Field of Classification Search .......... 701/3, 14, 701/29.1, 29.8, 30.5–30.9, 31.1  
See application file for complete search history.

(56) References Cited

U.S. PATENT DOCUMENTS

| | | | |
|---|---|---|---|
| 3,921,451 A | 11/1975 | Di Giacomo | |
| 4,557,141 A | 12/1985 | Poirier et al. | |
| 5,155,482 A | 10/1992 | Wynn | |
| 7,966,872 B2 * | 6/2011 | Lutke et al. | 73/118.03 |

FOREIGN PATENT DOCUMENTS

| | | |
|---|---|---|
| EP | 0795740 A | 9/1997 |
| GB | 2190501 A | 11/1987 |
| SU | 457302 A1 | 11/1988 |

OTHER PUBLICATIONS

PCT Int'l Search Report for PCT/EP2007/010384 completed by the EP Searching Authority on Aug. 8, 2008.

* cited by examiner

*Primary Examiner* — Richard M. Camby  
(74) *Attorney, Agent, or Firm* — Barnes & Thornburg LLP

(57) ABSTRACT

The present invention provides test equipment for testing an additional center tank (ACT) system of an aircraft. The ACT system comprising control means configured to perform functions of an Auxiliary Fuel Management Computer (AFMC) and an Auxiliary Level Sensing Control Unit (ALSCU). The test equipment comprises at least one test module adapted for coupling to the ACT system in place of at least a portion of the control means, the test module comprising means for generating one or more test signals and outputting the test signals to the ACT system.

15 Claims, 3 Drawing Sheets

TEST EQUIPMENT FOR TESTING AN ADDITIONAL CENTER TANK (ACT) SYSTEM OF AN AIRCRAFT

CROSS-REFERENCE TO RELATED APPLICATIONS

Figure 1:
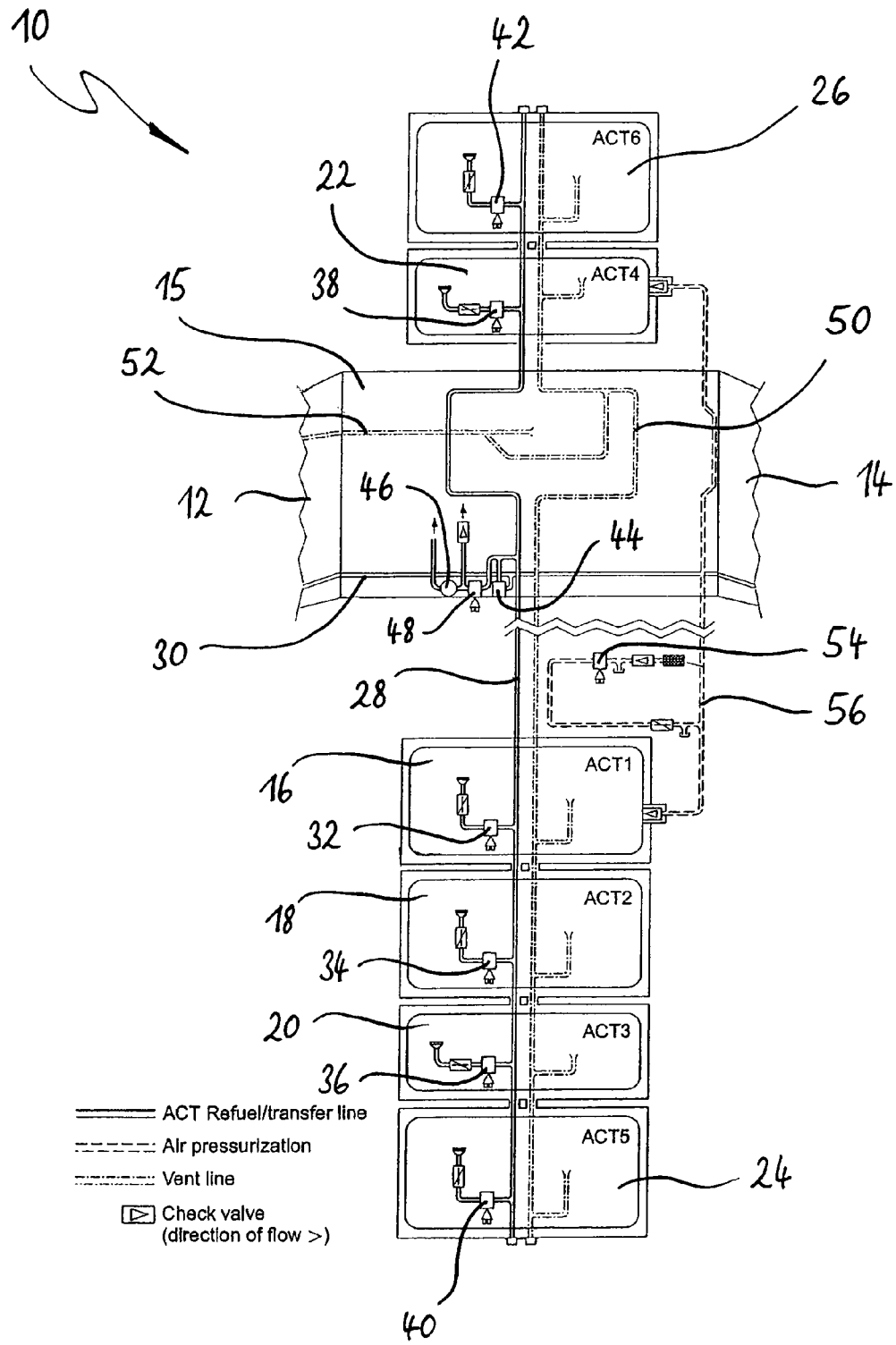

This application is a U.S. national counterpart application of international application Serial No. PCT/EP2007/010384 filed Nov. 29, 2007.

The present invention relates to test equipment for testing an additional center tank (ACT) system of an aircraft.

Modern cargo and passenger aircraft may be provided with an additional center tank (ACT) system to supplement the main fuel tank system. The ACT system may include one or more additional center tanks, all of which are located in the fuselage of the aircraft. The Airbus™ aircraft model A319CJ, for example, may be fitted with up to six additional center tanks. The main fuel tank system is typically comprised of one or more tanks in each wing and a center tank in the fuselage of the aircraft.

An ACT system incorporates numerous valves needed for fuel delivery to and from the ACTs and between the ACTs (during refueling and defueling as well as during in-flight fuel transfer) and for venting the ACTs. Examples of such valves are a fuel inlet valve for each additional center tank, one or more transfer valves for feeding fuel into the additional center tanks from the main tank system, one or more refuel valves for filling up the additional center tanks on the ground, one or more air shutoff valves for controlling flow of pressurized air into the additional center tanks, etc. Persons versed in the art will be generally familiar with the construction and operation of ACT systems in aircraft, especially those of the Airbus™ model series.

While fuel management of the ACT system may be performed by control means common to the main fuel system and the ACT system, aircraft are known to exist where dedicated control means are provided for this task. One such model is the above Airbus™ A319CJ. The dedicated ACT control means may comprise an Auxiliary Fuel Management Computer (AFMC) operating together with an Auxiliary Level Sensing Control Unit (ALSCU) via a network of relays. The AFMC, inter alia, controls auto transfer of ACT fuel to and from the main center tank and between the ACTs in a manner balancing the aircraft during transfer and ensuring that the center of gravity of the aircraft remains within limits.

Level sensors associated with the ACTs sense the presence of absence of fuel at various levels within the tanks. Specifically, the tank level sensing system may include a high level sensor in each ACT to sense tank contents at high level and end refuel of that tank. It may further comprise low level sensors to sense low level tank contents. The ALSCU processes the measured fuel levels and performs a comparison of low level sensor wet states to monitor whether the ACT fuel transfer is progressing in the correct order and if not to trigger a cockpit warning. Accordingly, the ACT level sensors and the ALSCU are involved in monitoring transfer of ACT fuel.

The ALSCU may also contain logic associated with the detection of damage to the forward ACT vent and refuel/transfer lines and their subsequent isolation.

The AFMC additionally receives fuel quantities and other information related to the main tank system from a Fuel Quantity Indicating Computer (FQIC). The AFMC uses the information it receives from the ALSCU and the FQIC to calculate ACT and total aircraft fuel quantities for output to an Electronic Centralized Aircraft Monitor (ECAM) in the cockpit and to other receivers and also for control of automatic refuel of the ACTs.

The AFMC and ALSCU may be separate units to be connected to separate dedicated plug-in interface sockets of the ACT system. It may be also envisaged for the AFMC and ALSCU to be combined in a single control unit.

Predelivery tests as well as ground tests during normal maintenance procedures require, inter alia, checking the ACT valves and/or the AFMC and/or the ALSCU for correct operation, i.e., whether the respective components properly react to certain conditions and/or to certain commands. The commands may include valve commands manually initiated from the aircraft cockpit. For example, in response to an inlet valve actuating command, a corresponding signal must be produced to cause some kind of indicating means, e.g. in the cockpit, to display that a manual valve actuating command was given in regard to an ACT valve. Further, each time a valve actuating command has occurred it must be checked whether the respective valve is in fact actuated in accordance with the valve actuating command. Finally, there is a need to check whether the ACT valves assume predetermined valve positions following detection of an ACT system failure (such as, e.g., an ACT fuel transfer fault or an ACT low fuel level condition).

In view of the above, it is an object of the present invention to provide test equipment that allows easy and efficient testing of at least certain aspects of an aircraft ACT system.

To achieve this object, the present invention provides test equipment for testing an ACT system of an aircraft, the ACT system comprising control means configured to perform functions of an Auxiliary Fuel Management Computer (AFMC) and an Auxiliary Level Sensing Control Unit (ALSCU), wherein the test equipment comprises at least one test module adapted for coupling to the ACT system in place of at least a portion of the control means, the test module comprising means for generating one or more test signals and outputting the test signals to the ACT system.

The test module preferably comprises switch means for switching on and off the one or more test signals. The switch means may be manually operable. In addition or in the alternative, the test equipment may include test program software for execution by a processor, wherein the test program software is so configured as to effect the generation of one or more predetermined test signals or one or more predetermined test signal sequences output by the test module.

In a simple embodiment, the test signals may be high or low electric potential signals with the low state corresponding to a ground potential and the high state corresponding to a positive or negative electric potential different from the ground potential. In particular, the high potential may correspond to a supply voltage level of an on-board electric supply voltage system of the aircraft, and the test module may obtain the high potential from the on-board electric supply voltage system. Of course, the test equipment may also include its own source of electric voltage independent of the on-board electric supply voltage system.

In one embodiment, the test equipment comprises a first test module adapted for coupling to the ACT system in place of a portion of the control means performing AFMC functions, wherein the first test module comprises means for generating one or more test signals simulating one or more ACT valve commands. This embodiment may be useful for testing proper operation of various ACT valves.

The one or more simulated ACT valve commands may specifically comprise:
- an ACT inlet valve command in relation to each of one or more ACT inlet valves, and/or
- an ACT air shutoff valve command, and/or
- an ACT vent valve command, and/or
- an ACT refuel valve command.

The first test module may further comprise means for generating one or more test signals simulating at least one of a predetermined AFMC transfer fault condition and a predetermined AFMC low-level condition.

The first test module may also comprise means for receiving one or more ACT valve condition signals representing open and closing conditions of one or more ACT valves, wherein the first test module further comprises first indicating means for visually indicating one or more ACT valve conditions.

The first indicating means may be specifically configured to indicate:
- an ACT inlet valve condition in relation to each of one or more ACT inlet valves, and/or
- an ACT air shutoff valve condition, and/or
- an ACT vent valve condition, and/or
- an ACT fuel isolation valve condition, and/or
- an ACT transfer valve condition, and/or
- an ACT vent isolation valve condition.

Advantageously, the first indicating means include two LEDs in relation to each of) one or more ACT valves, one of the LEDs indicating, when illuminated, an open valve position and the other indicating, when illuminated, a closed valve position. For example, the one LED may be green and the other red.

The first test module may comprise second indicating means for indicating generation of one or more ACT valve commands effected through manual operation of one or more valve operating elements provided in a cockpit of the aircraft.

In another embodiment, the test equipment comprises a second test module adapted for coupling to the ACT system in place of a portion of the control means performing) ALSCU functions with another portion of the control means performing AFMC functions left in place in the ACT system, wherein the second test module comprises means for generating one or more test signals simulating one or more ACT fuel level indications. This embodiment is useful, inter alia, for testing proper functioning of the AFMC portion of the control means.

Particularly, the second test module may comprise a two-position switch in relation to each of one or more additional center fuel tanks to generate one or more test signals simulating wet and dry fuel tank conditions.

The second test module may also comprise means for generating one or more test signals simulating:
- a valve command for actuating a first servo motor of a fuel isolation valve, and/or
- a valve command for actuating a second servo motor of the fuel isolation valve, and/or
- a valve command for actuating a first servo motor of a vent isolation valve, and/or
- a valve command for actuating a second servo motor of the vent isolation valve.

Regarding the above, it should be appreciated that at least some of the many valves typically found in an ACT system may be implemented with two independent servo actuators (servo motors) in order to provide redundancy. An exception may be the refuel valve which is oftentimes equipped with a single servo actuator only.

Further, the second test module may comprise means for generating one or more test signals simulating:
- a pipe damage indication, and/or
- a warning wire circuit closing command, and/or
- a predetermined ACT transfer-fault condition.

The second test module may also comprise indicating means for indicating whether or not the warning wire circuit is closed and/or whether an emergency power supply of the aircraft is operative.

Figure 2:
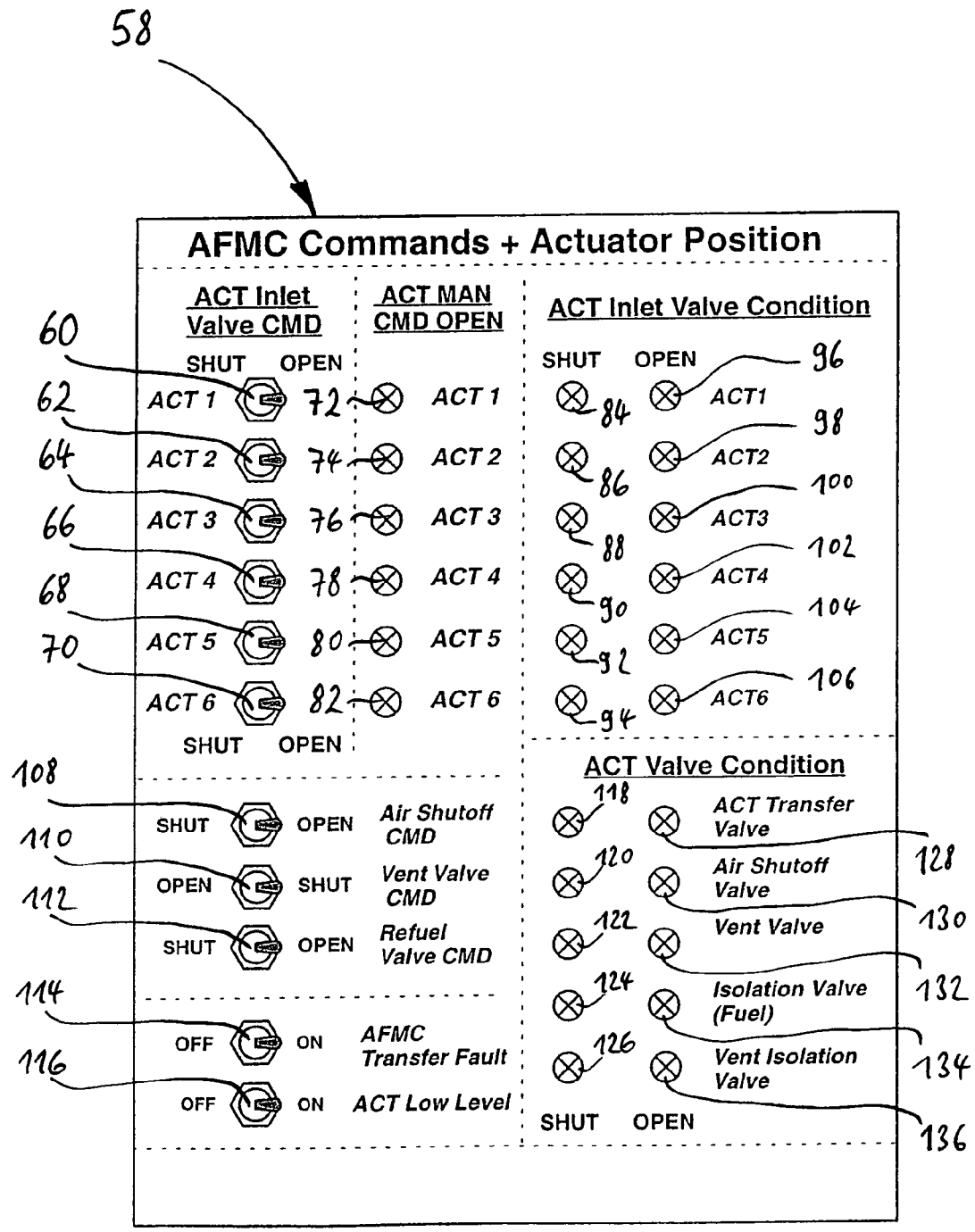
Figure 3:
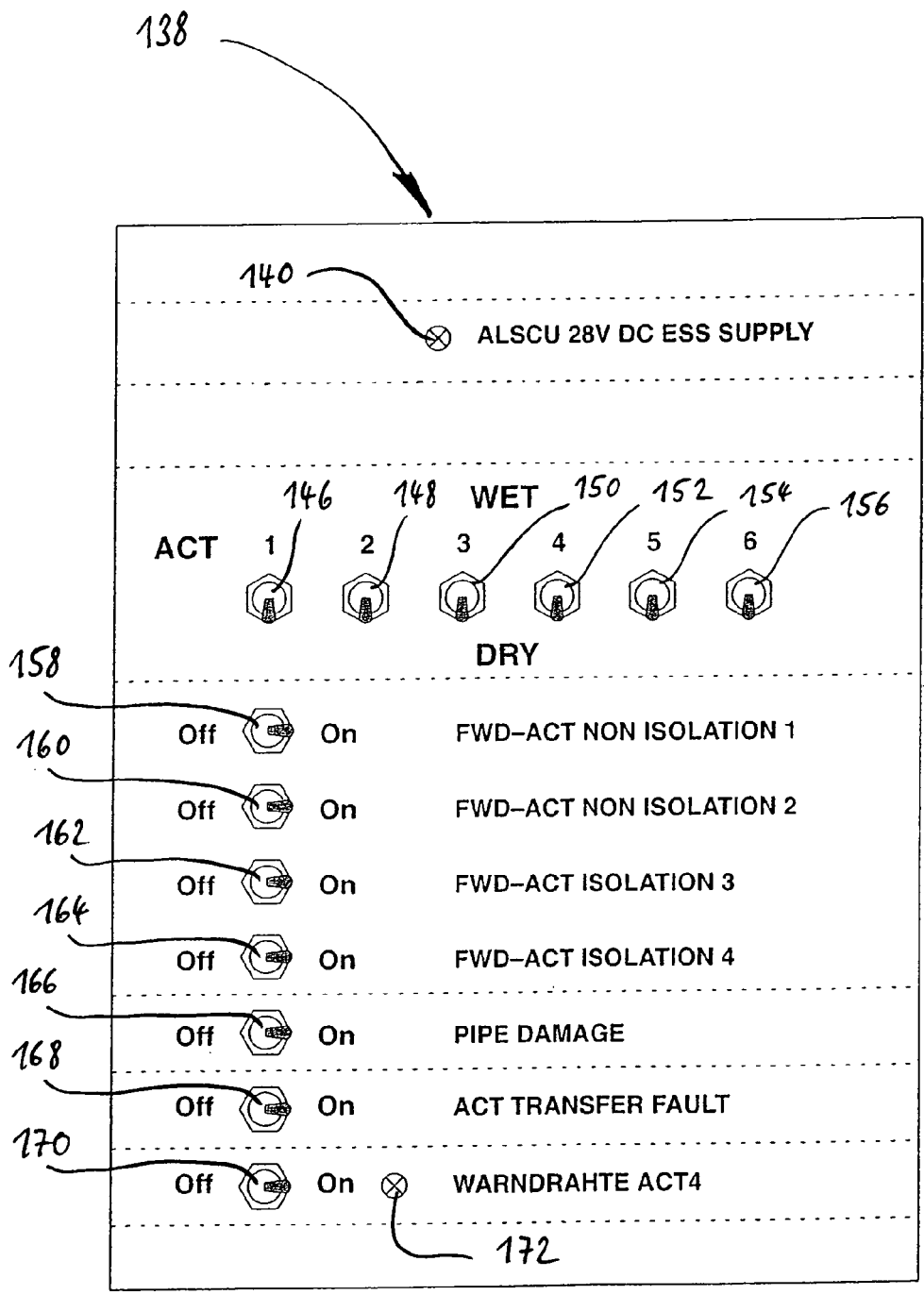

The present invention will now be explained in more detail with reference to the enclosed drawings, in which:

FIG. 1 is a schematic plan view of an additional center tank fuel system in an aircraft, FIG. 2 shows a front panel of a test box for simulating ACT valve commands, and FIG. 3 shows a front panel of a test box for simulating ALSCU signals.

FIG. 1 shows a schematic plan view of the general arrangement of a fuel tank system of a commercial passenger or cargo aircraft according to an exemplary embodiment. The fuel tank system comprises a main tank system and an additional center tank system (ACT system). The ACT system is generally designated 10 in the figure. The main tank system may comprise a left wing tank 12, a right wing tank 14 and a center tank 15.

In the illustrated embodiment, the aircraft is fitted with six ACTs designated 16, 18, 20, 22, 24 and 26. The ACTs 16-26 are located in a cargo area of the fuselage of the aircraft and are connected to each other via a fuel line 28. They are further connected to the main wing tanks 12, 14 and the center tank 15 via a fuel line 30. The fuel line 30 is the main refuel/defuel line.

Each additional center tank (ACT) 16-26 is provided with a fuel inlet-valve 32, 34, 36, 38, 40, 42, respectively.

A refuel valve 44 allows refueling of the ACT system. During refueling, the refuel valve 44 is set to an open position and will be closed at all other times.

An ACT transfer fuel pump 46 and an ACT transfer valve 48 provide a mechanism for transferring fuel between the main tank system and the ACT system 10. Such fuel transfer occurs not only during refueling, but also during flight when the fuel loaded by the aircraft is progressively burnt starting with the ACT fuel. To this end, the ACT fuel may be transferred via the fuel line 30 to the main center tank 15 in a manner of sequentially emptying one ACT after another.

In order to allow venting of the ACT-system, a vent conduit 50 connected to all additional center tanks 16-26 and coupled to a center tank vent line 52 is provided. Vent valves not shown in FIG. 1 allow selective venting of the additional center tanks 16-26.

When fuel is drawn from the additional center tanks 16-26, pressurized air is fed into the additional center tanks to prevent the formation of a potentially explosive gaseous mixture in the additional center tanks. The pressurized air is routed via an air shutoff valve 54 arranged in an air pressurization line 56 into additional center tanks 16 and 22. Since all ACTs 16-26 are in fluid communication with each other via vent conduit 50, the pressurized air fed into ACTs 16 and 22 will also be fed into the remaining ACTs 18, 20, 24 and 26.

Control of the ACT system 10 is effected by an Auxiliary Fuel Management Computer (AFMC) operating together with an Auxiliary Level Sensing Control Unit (ALSCU) not shown in the figures. Prior to delivery of a new aircraft to a customer and also in regular maintenance procedures, the entire ACT system 10 including its valves and the AFMC should be tested to ensure proper operation of the system.

FIG. 2 shows an exemplary and non-limiting embodiment of a front panel 58 of a test box adapted for simulating ACT valve commands. The test box replaces the AFMC. In other words, to bring the test box into use, the AFMC must first be disconnected from the ACT system 10. The test box may then be connected to the ACT system 10 using the same electric connector interface to which the AMFC was connected.

In the left upper part of the illustrated front panel 58, a vertical row of six manually operable, two-position (on/off) switches 60, 62, 64, 66, 68, 70 is provided. Of these, switch 60 is for simulating an ACT inlet valve command to the fuel inlet valve 32 associated to ACT 16, switch 62 is for simulating an ACT inlet valve command to the fuel inlet valve 34 associated to ACT 18, and so forth. Actuating the switches 60-70 to move their operating levers to the right-side position as shown in FIG. 2 corresponds to simulating an "open" command, i.e., a command that will cause the ACT inlet valves to move open. Moving the switch operating levers to the left in FIG. 2, on the other hand, corresponds to simulating a "close" command to the ACT inlet valves.

To the right of the switches 60-70 there is provided on the front panel 58 a vertical row of LEDs 72-82 to indicate whenever an ACT inlet valve "open" command has been manually initiated from a valve command panel (not shown herein) in the cockpit of the aircraft. Thus, a test person has two options for testing the ACT inlet valves, one by simulating valve commands using the switches 60-70 of the test box of FIG. 2 and another by manipulating on the valve command panel in the cockpit. Inlet valve commands so generated from the cockpit valve command panel are routed to the test box via the mentioned connector interface of the ACT system 10.

In order to easily verify whether an ACT inlet valve command (whether from the test box or from the cockpit valve command panel) has caused the respective ACT inlet valve to assume the desired position, two vertical rows of LEDs are provided to the right of the row of LEDs 72-82. These two vertical rows indicate open and shut inlet valve conditions of the inlet valves 32-42. A first row of LEDs 84-94 consists of six red LEDs which, when illuminated, indicate that the respective inlet valves are in the closed position. A second row of LEDs 96-106 consists of six green LEDs which, when illuminated, indicate that the respective inlet valves are in the open position.

Below the row of switches 60-70, a further set of five manually operable, two-position (on/off) switches 108-116 are arranged in a vertical row. These may be used for simulating an air shutoff valve command (switch 108), a vent valve command (switch 110), a refuel valve command (switch 112), an AFMC transfer fault condition (switch 114) and an ACT low fuel level condition (switch 116). While switches 108 and 112 operate in the same way as switches 60-70, switch 110 is reversed in that the "open" command corresponds to the left position of the switch operating lever while the "close" command corresponds to the right position of the switch operating lever.

Right-hand of the switches 108-116 there are located on the front panel 58 two further vertical rows of LEDs indicating, in a similar manner as described above in connection with the LEDs 72-82 and the LEDs 84-94, the valve position of the ACT transfer valve 48, the air shutoff valve 54, a vent valve, a fuel isolation valve and a vent isolation valve.

When an AFMC transfer fault condition (as may be caused, e.g., by failure of the transfer fuel pump 46 and/or the transfer valve 48) is simulated by setting switch 114 to its right position, at least a portion of the ACT valves depicted on the front panel 58 should be automatically moved to certain predetermined positions. By checking which of the various LEDs on the front panel 58 are illuminated, it can be verified whether or not these predetermined valve positions have been attained.

FIG. 3 shows an exemplary and non-limiting embodiment of a front panel 138 of a test box adapted for simulating ALSCU signals. This test box replaces the ALSCU. In other words, to bring the test box into use, the ALSCU must first be disconnected from the ACT system 10. The test box may then be connected to the ACT system 10 using the same electric connector interface to which the ALSCU was connected.

In an upper part of the front panel 138, an LED 140 is located which, when illuminated, indicates that an emergency power supply which delivers a predetermined electric voltage to the test box is operating properly. The emergency power supply (not shown) includes a timer-relay which may be set to a predefined time, e.g., 20 seconds. If the timer-relay functions properly, the LED 140 should be illuminated for 20 seconds and then turn off.

Further, a horizontal row of manually operable switches 146-156 below the LEDs 142, 144 serve to simulate predetermined fuel level indication signals for each ACT. The switches 146-156 are two-position (on/off) switches to simulate "wet" and "dry" ACT level conditions. Using the switches 146-156 it is possible to check whether the AFMC, which is left in place in the ACT system during use of the ALSCU substitute test box, operates correctly, i.e., causes a predetermined reaction. For example, the AFMC may be required to cause a visual indication of the fuel levels on a cockpit display panel.

Below the horizontal row of switches 146-156, there is provided on the front panel 138 a vertical row of two-position (on/off) switches 158-170. Switch 158, if set to "on", simulates an actuating command for a first servo motor of an isolation valve located in a fuel line. Switch 160, if set to "on", simulates an actuating command for a first servo motor of a vent valve. Switch 162, if set to "on", simulates an actuating command for a second servo motor of the fuel isolation valve, and switch 164 may be used to simulate an actuating command for a second servo motor of the vent valve. It can then be checked whether the AFMC causes a corresponding cockpit display and whether the corresponding valves assume a position corresponding to the actuating command.

Switch 166, if set to "on", simulates a damaged vent conduit. It can then be checked whether the AFMC causes a corresponding cockpit display. Switch 168, if set to "on", simulates an ALSCU output signal indicating, e.g., a failure of the fuel transfer pump 46. One can thus check whether the AFMC causes a corresponding cockpit display.

Finally, switch 170, if set to "on", simulates a closing command to close a warning wire circuit provided to detect a damaged vent conduit. LED 172 provided to the right of switch 170 is illuminated if the warning wire circuit is successfully closed.

The invention claimed is:

1. Test equipment for testing an additional center tank (ACT) system of an aircraft, the ACT system comprising control means configured to perform functions of an Auxiliary Fuel Management Computer (AFMC) and an Auxiliary Level Sensing Control Unit (ALSCU), wherein the test equipment comprises at least one test module adapted for coupling to the ACT system in place of at least a portion of the control means, the test module comprising means for generating one or more test signals and outputting the test signals to the ACT system, wherein the at least one test module comprises at least one of:

a first test module adapted for coupling to the ACT system in place of a portion of the control means performing AFMC functions, wherein the first test module comprises means for generating one or more test signals simulating one or more ACT valve commands; and a second test module adapted for coupling to the ACT system in place of a portion of the control means performing ALSCU functions with another portion of the control means performing AFMC functions left in place in the ACT system, wherein the second test module comprises means for generating one or more test signals simulating one or more ACT fuel level indications.

2. The test equipment of claim 1, wherein at least one of the first and second test modules comprises switch means for switching on and off the one or more test signals.

3. The test equipment of claim 2, wherein the switch means are manually operable.

4. The test equipment of claim 1, wherein the one or more simulated ACT valve commands comprise:
   an ACT inlet valve command in relation to each of one or more ACT inlet valves, and/or
   an ACT air shutoff valve command, and/or
   an ACT vent valve command, and/or
   an ACT refuel valve command.

5. The test equipment of claim 1, wherein the first test module comprises means for generating one or more test signals simulating at least one of a predetermined AFMC transfer fault condition and a predetermined AFMC low-level condition.

6. The test equipment of claim 1, wherein the first test module comprises means for receiving one or more ACT valve condition signals representing open and closing conditions of one or more ACT valves, wherein the first test module further comprises first indicating means for visually indicating one or more ACT valve conditions.

7. The test equipment of claim 6, wherein the first indicating means are configured to indicate:
   an ACT inlet valve condition in relation to each of one or more ACT inlet valves, and/or
   an ACT air shutoff valve condition, and/or
   an ACT vent valve condition, and/or
   an ACT fuel isolation valve condition, and/or
   an ACT transfer valve condition, and/or
   an ACT vent isolation valve condition.

8. The test equipment of claim 6, wherein the first indicating means include two LEDs in relation to each of one or more ACT valves, one of the LEDs indicating, when illuminated, an open valve position and the other indicating, when illuminated, a closed valve position.

9. The test equipment of claim 8, wherein the one LED is green and the other LED is red.

10. The test equipment of claim 1, wherein the first test module comprises second indicating means for indicating generation of one or more ACT valve commands effected through manual operation of one or more valve operating elements provided in a cockpit of the aircraft.

11. The test equipment of claim 1, wherein the second test module comprises a two-position switch in relation to each of one or more additional center fuel tanks to generate one or more test signals simulating wet and dry fuel tank conditions.

12. The test equipment of claim 1, wherein the second test module comprises means for generating one or more test signals simulating:
   a valve command for actuating a first servo motor of a fuel isolation valve, and/or
   a valve command for actuating a second servo motor of the fuel isolation valve, and/or
   a valve command for actuating a first servo motor of a vent isolation valve, and/or
   a valve command for actuating a second servo motor of the vent isolation valve.

13. The test equipment of claim 1, wherein the second test module comprises means for generating one or more test signals simulating:
   a pipe damage indication, and/or
   a warning wire circuit closing command, and/or
   a predetermined ACT transfer-fault condition.

14. The test equipment of claim 13, wherein the second test module comprises indicating means for indicating whether or not the warning wire circuit is closed.

15. The test equipment of claim 1, wherein the second test module comprises indicating means for indicating whether an emergency power supply of the aircraft is operative.

* * * * *